United States Patent [19]

Davis

[11] 4,017,395
[45] Apr. 12, 1977

[54] RECIRCULATING SEWERAGE SYSTEM
[75] Inventor: Robert B. Davis, New Britain, Conn.
[73] Assignee: Koehler-Dayton, Inc., New Britain, Conn.
[22] Filed: June 27, 1974
[21] Appl. No.: 483,636
[52] U.S. Cl. .................................. 210/167; 4/10; 210/197
[51] Int. Cl.² ................................ B01D 29/04
[58] Field of Search ............ 210/60, 167, 195, 196, 210/197; 4/10, 115

[56] References Cited
UNITED STATES PATENTS

| 1,303,358 | 5/1919 | Montgomery | 210/60 X |
| 3,112,497 | 12/1963 | Call | 4/10 |
| 3,195,149 | 7/1965 | Carlson | 4/10 |
| 3,275,550 | 9/1966 | Daubenspeck | 210/60 |
| 3,579,646 | 5/1968 | Lekberg | 210/167 X |

Primary Examiner—Theodore A. Granger
Attorney, Agent, or Firm—Spencer T. Smith

[57] ABSTRACT

A recirculating sewerage system comprising a water closet, a selectively inclined effluent receiving member including filtering media at least at the upper portion thereof, means for directing the effluent flushed from the water closet onto the top surface of the effluent receiving member proximate the uppermost portion thereof whereby the liquid portion of the flushed effluent will pass through the filtering media and the solid portion of the flushed effluent will slide down the effluent receiving member, means for collecting the portion of the flushed effluent which passes through the filtering media, means for selectively recirculating the filtrate collected in the collecting means to flush the water closet, means for selectively draining the filtrate collecting means, means for collecting the portion of the flushed effluent which slides off of the effluent receiving member, a reservoir for receiving grey water discharge from a bathing facility, means for selectively directing grey water contained in the reservoir to the filtrate collecting means, and means for directing grey water from the reservoir to the bottom portion of the effluent receiving member when the level of the grey water in the reservoir exceeds a predetermined maximum level whereby any solids which remain on the effluent receiving member will be washed therefrom into the solids collecting means.

4 Claims, 1 Drawing Figure

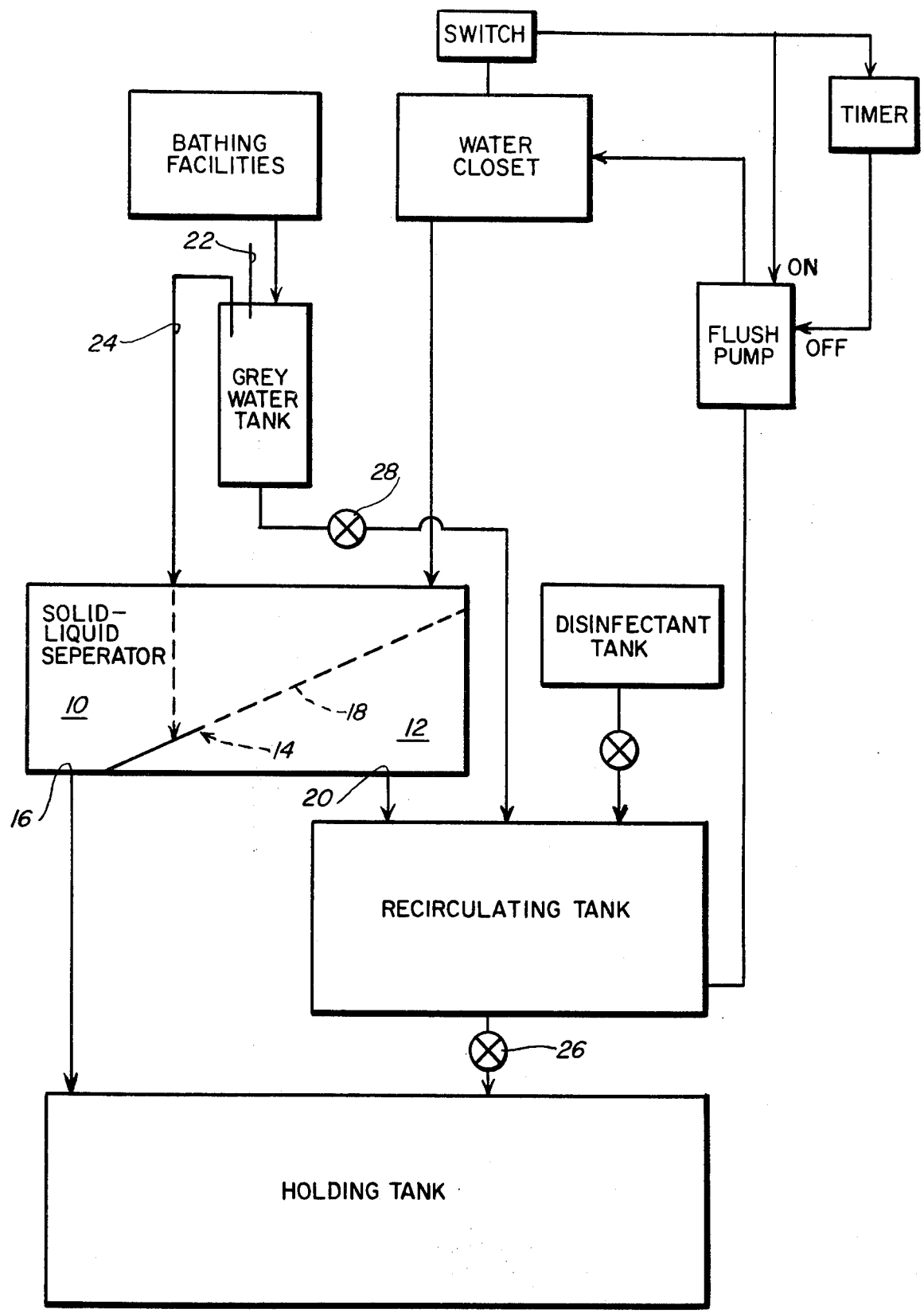

RECIRCULATING SEWERAGE SYSTEM

The present invention relates to recirculating sewerage systems wherein the liquid component of the effluent flushed from a toilet is selectively recirculated to flush the toilet.

In recirculating toilets such as disclosed in U.S. Pat. No. 3,545,011, the solid and liquid components of discharged effluent are retained in a recirculating tank where the solids macerate in the liquid thereby progressively contaminating the liquid. Such progressive contamination shortens the period during which the odor and color of the liquid can be effectively controlled with suitable additives and increases the amount of such additives which must be introduced into the recirculating tank.

It is, accordingly, an object of the present invention to provide a recirculating sewerage system wherein the effluent flushed from a toilet is received by an inclined member which includes a filter at least at the upper portion of the member whereby the liquid portion of the effluent will pass through the filter for collection in a recirculating tank and subsequent use as the flushing medium and the solid portion of the effluent will slide off of the member and be collected in a suitable holding tank. Maceration of the solids in the filtrate which is to be recirculated will, accordingly, be prevented.

It is another object of the present invention to collect in a reservoir a predetermined volume of grey water which will be utilized to periodically prime the recirculating tank and to direct additional grey water collected by the reservoir to the lower portion of the inclined member to effectively wash any residue of solids remaining thereon into the holding tank.

Among the advantages of the present invention is the provision of a recirculating system wherein the requirements of color and odor control additives are substantially reduced over prior art systems.

Additional objects and advantages of the present invention will become apparent from the following portion of this specification, and from the accompanying drawing, which illustrates, in accordance with the mandate of the patent statutes a presently preferred embodiment incorporating the principles of the invention.

Referring to the drawing:

The sole FIGURE is a diagrammatic representation of the recirculating sewerage system made in accordance with the teachings of the present invention.

The recirculating sewerage system includes a solid-liquid separator, which is divided into receptacle 10 and filtrate 12 compartments by an effluent receiving member 14, which is preferably inclined to slope downwardly towards the drainage opening 16 of the receptacle compartment. The entire effluent receiving member may be a screen 18 or any other type of filter or as in the preferred embodiment, only the upper portion of the effluent receiving member may comprise such a filter element. Effluent flushed from a water closet is discharged into the receptacle compartment proximate the top of the screen and travels downwardly by gravitational action. The liquid component of the effluent passes through the screen or filter into the filtrate compartment from which it immediately drains through an opening 20 into the recirculating tank. Accordingly, the solid waste components of the effluent will not, as is the case in conventional systems, macerate within the liquid components of the effluent, and as a result, the filtrate will not become progressively contaminated by the solids. The orientation and size of the screen may be selected to maximize the amount of liquid passed through the screen into the filtrate compartment, while at the same time assuring that the solid components of the effluent will proceed downwardly along the screen towards the solid waste discharge opening 16 in the receptacle compartment.

To flush the water closet, a suitable switch is closed to energize the flush pump for a selected interval of time and filtrate is drawn from the recirculating tank and discharged into the water closet under a predetermined head of pressure.

Color and odor control additives, which are stored in a disinfectant tank, may be added to the recirculating tank as desired. As can be readily appreciated, the amount of color and odor control additives which will be required to effectively mask the color and odor of the filtrate, will be substantially reduced from corresponding amounts required in prior art systems.

The drain water (conventionally referred to as grey water) from some or all of the bathing facilities such as shower and basin drains of a building or a ship, for example, is collected in a vented 22 grey water tank or reservoir. Grey water will be collected in the grey water reservoir until liquid in the siphon 24 is forced into the downwardly directed drain leg, whereupon a charge of grey water, equal in volume to the volume of the grey water reservoir above the inlet of the siphon, will be discharged from the drain leg of the siphon into the solid-liquid separator to strike the lower solid portion of the selectively inclined effluent receiving member 14 to wash any solids which remain on the bottom portion of the inclined effluent receiving member into the holding tank.

The size of the grey water reservoir is selectively chosen so that the volume of grey water having a level terminating at the inlet of the siphon will provide the desired volume of prime for the recirculating tank and the number and character of the bathing facilities is selectively chosen so that enough grey water in excess of this volume will be supplied to the grey water reservoir during the operation of the system to assure that all solids which might remain on the bottom portion of the effluent receiving member will be periodically washed into the holding tank.

While in the preferred embodiment, the charges of grey water are directed through the top of the solid-liquid separator downwardly against the effluent receiving member, these charges could also be directed from the side of the solid-liquid separator laterally across the bottom portion of the effluent receiving member, or in any other manner which would effectively wash the bottom portion of the effluent receiving member.

In operation, the recirculating tank is periodically drained, preferably after the passage of a predetermined period of time, into the holding tank by opening the recirculating tank control valve 26. After the recirculating tank has been completely drained, the recirculating tank control valve 26 is closed and the grey water reservoir control valve 28 is opened to admit at least the predetermined volume of grey water contained by the reservoir into the recirculating tank.

To provide an initial volume of prime, the bathing facilities may be utilized for a period of time sufficient to fill the grey water tank, whereupon the grey water reservoir control valve 28 can be opened to introduce the prime into the empty recirculating tank.

What is claimed is:

1. A recirculating sewerage system comprising
water closet means,
a selectively inclined effluent receiving member including filtering media at least at the upper portion thereof,
means for directing the effluent flushed from said water closet means onto the top surface of said effluent receiving member proximate the uppermost portion thereof, whereby the liquid portion of the flushed effluent will pass through said filtering media and the solid portion of the flushed effluent will slide down said effluent receiving member,
means for collecting the portion of the flushed effluent which filters through said filtering media,
means for selectively draining said filtrate collecting means,
means for collecting the portion of the flushed effluent which slides off of said effluent receiving member,
means for priming said filtrate collecting means with
a predetermined volume of grey water including
a reservoir for receiving grey water discharged from a bathing facility, the volume of said reservoir being selected so that said predetermined volume of grey water can be contained therein, and
means for selectively draining said reservoir into said filtrate collecting means,
means for selectively directing the collected filtrate to said water closet means to flush same, and
means for directing grey water received by said reservoir to the bottom portion of said effluent receiving member when the level of the grey water contained in said reservoir exceeds a predetermined maximum level substantially corresponding to the level of said predetermined volume of grey water contained therein whereby any solids which remain on said effluent receiving member will be washed therefrom into said solids collecting means.

2. A recirculating sewerage system according to claim 1, further comprising
means for directing a predetermined charge of grey water received by said reservoir to said receptacle compartment when the level of the grey water exceeds said predetermined maximum level.

3. A recirculating sewerage system according to claim 2, further comprising a source of disinfectant and means for selectively directing at least a portion of the disinfectant contained by said source into said filtrate collecting means.

4. A recirculating sewerage system according to claim 1, further comprising a solid-liquid separator tank for containing said selectively inclined effluent receiving member and wherein said directing means passes through the top of said solid-liquid separator tank to discharge the grey water downwardly onto the bottom portion of said effluent receiving member.

* * * * *